Patented Sept. 13, 1927.

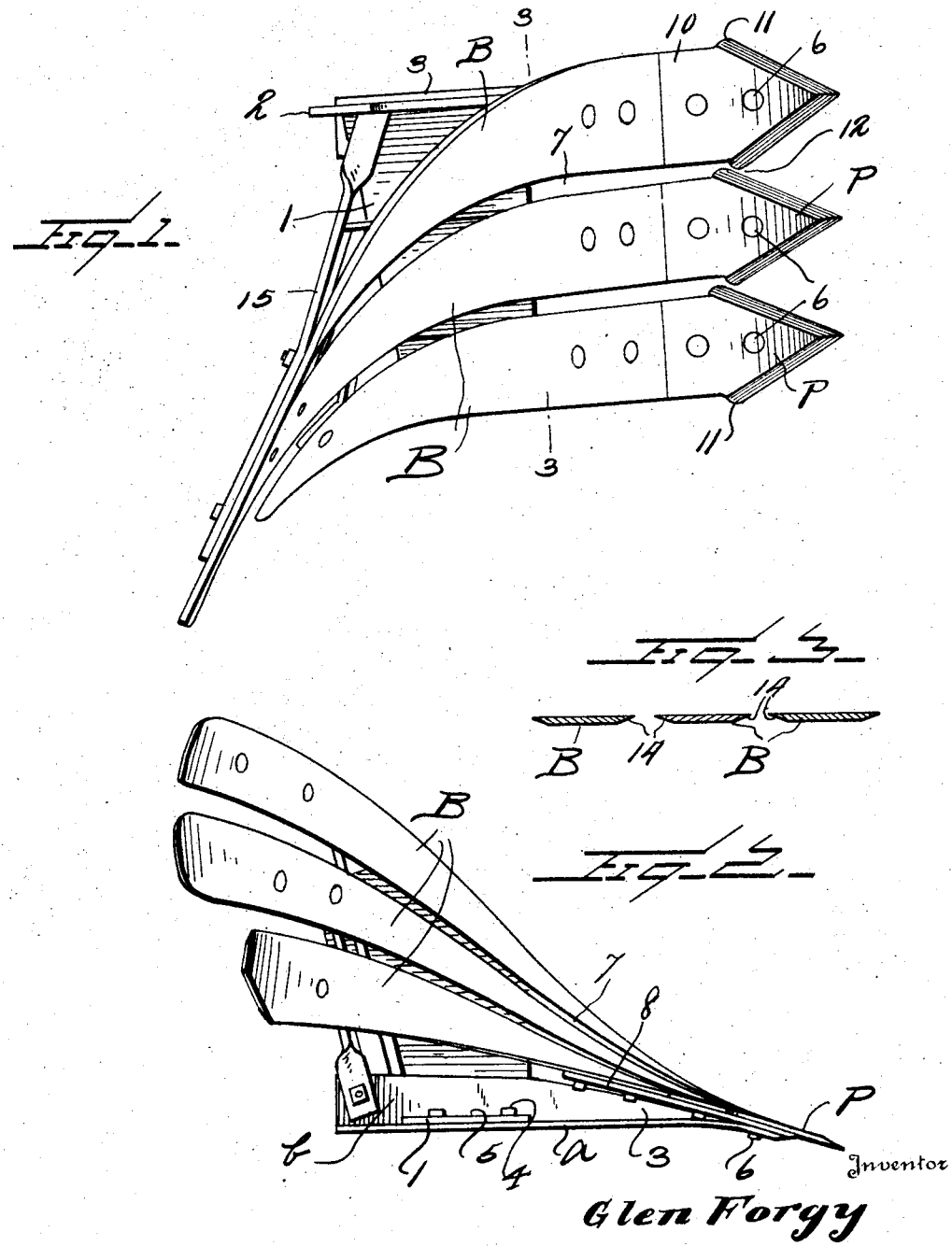

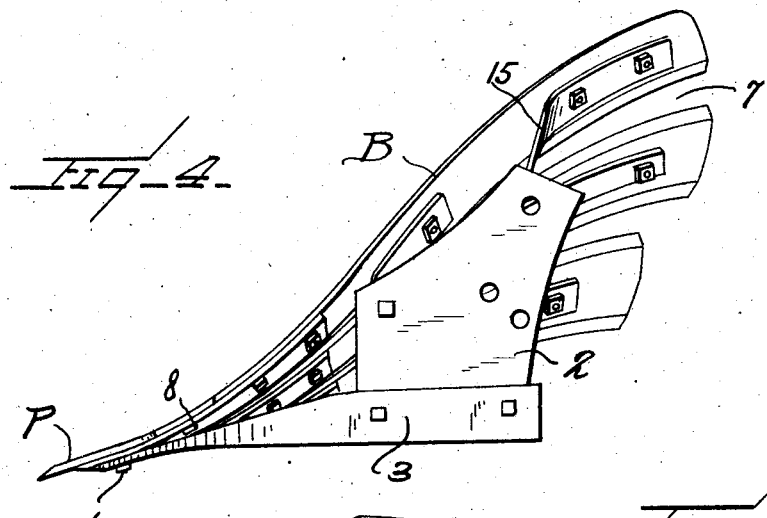
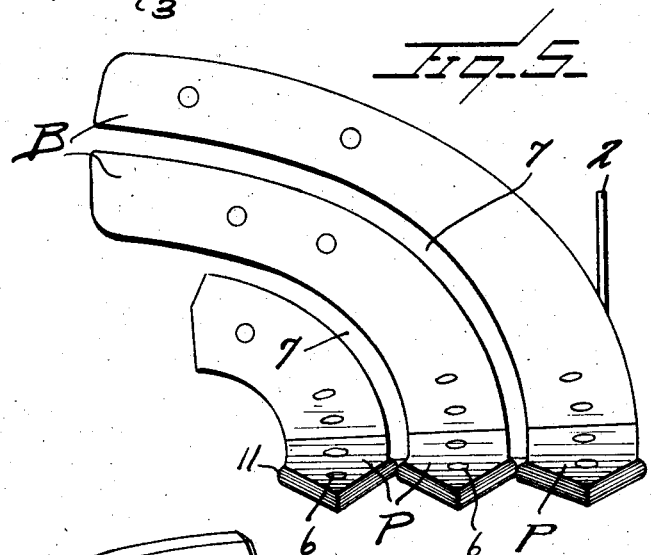
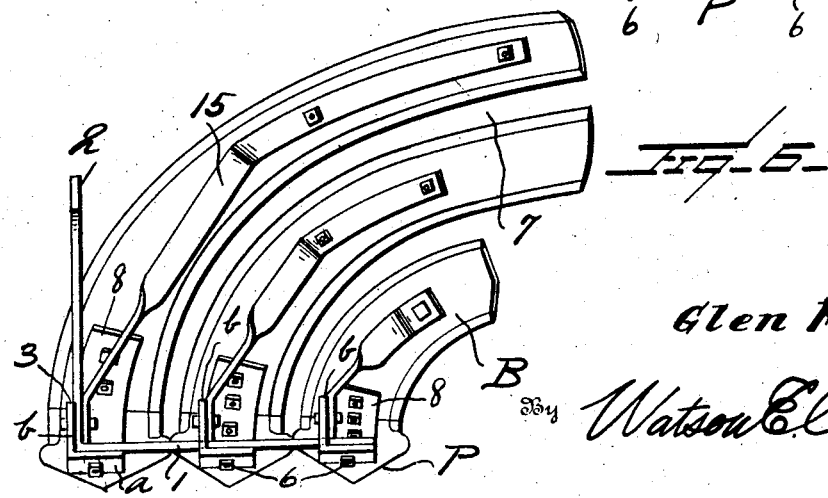

1,642,301

UNITED STATES PATENT OFFICE.

GLEN FORGY, OF FRANKFORT, KANSAS.

PLOW BOTTOM.

Application filed January 29, 1926. Serial No. 84,735.

This invention relates to certain improvements in plow bottoms and it is an object of the invention to provide a device of this character constructed in a manner whereby the same may be readily caused to operate with a minimum of direct draft resistance and whereby the tendency of side draft is substantially eliminated.

It is also an object of the invention to provide a device of this kind comprising a plurality of elongated members or blades disposed on requisite curvature to effect the required turning of the soil during a plowing operation and wherein adjacent of said members or blades are spaced apart to provide passage for roots or the like which may be encountered.

Furthermore, it is an object of the invention to provide a device of this kind comprising a plurality of elongated members or blades arranged in an assembly whereby clearance spaces are provided between adjacent blades, the forward or working end portions of the members or blades being provided with means to effect a severance of a root or the like.

Another object of the invention is to provide a device of this kind comprising a plurality of elongated members or blades arranged on suitable curvature with adjacent blades spaced one from the other, together with means for maintaining said members or blades in desired assembly, said supporting means including a frog positioned a material distance inwardly of the working ends or points of the members or blades so that the same, during a plowing operation, is free of contact with the ground either from above or to one side whereby the plow will advance with a minimum of draft resistance.

The invention consists in the details of construction and in the combination and arrangement of the several parts of my improved plow bottom whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a plow bottom constructed in accordance with an embodiment of my invention;

Figure 2 is a view in side elevation from the turning side of the device as illustrated in Figure 1;

Figure 3 is a sectional view taken substantially on the line 3—3 of Figure 1;

Figure 4 is an elevational view of the device as herein disclosed looking at the land side of the plow;

Figure 5 is a view in front elevation of the device as herein disclosed;

Figure 6 is a view in rear elevation of the device as herein set forth;

Figure 7 is a view in top plan illustrating a point constructed in accordance with a further embodiment of my invention.

As disclosed in the accompanying drawings, 1 denotes a frog or base plate of desired dimensions and which is provided at its land side end with an upstanding plate or bracket 2 to which a plow beam is adapted to be coupled. I do not, however, wish to be understood as limiting myself to the use of this plate 2 as any operative connection may be had with the plow bottom in its entirety as may best comply with the requirements of practice. However, by the use of the plate 2 my improved device is adaptable for use in connection with any standard plow beam.

As herein disclosed, the frog or plate 1 at its extremities and at a point substantially midway its ends has secured thereto the arms 3 disposed substantially at right angles to the frog or plate 1 or disposed in the same general direction as the travel of the plow bottom in a working operation. Each of these arms 3, as herein disclosed, constitutes an angle iron with one of its flanges *a* contacting with the frog or plate 1 from below and preferably bolted or otherwise secured thereto, as at 4. The flange *b* of the arm 3 is vertically disposed. The flange *b* of the arm 3 at the land end of the frog or plate 1 overlies the outer face of the upstanding plate 2 while the lower portions of the flanges *b* of the remaining arms 3 are suitably slotted, as at 5, to permit the passage of the frog or plate 1 therethrough whereby the requisite assembly of said arms 3 with the frog or plate 1 is effectively obtained.

The arms 3 extend a material distance in advance of the frog or plate 1 and the forward end portions thereof are bolted, as at 6, with a plowing or cutting point P. The point P is arranged in continuity with the lower and forward end portion of an elongated member or blade B extending upwardly and outwardly on predetermined curves or in the fashion of a spiral, said blade being relatively broad so that it will constitute an effective lifting and turning medium for the soil cut or loosened by the point P. It is also to be particularly noted that the blade B is disposed on a gradual lateral twist through an arc of substantially one hundred and eighty degrees from its rear or upward end to its forward or lower end so that, during a plowing operation, the point P at the lower or forward end of the blade will travel through the soil at a predetermined working depth in substantially a flat or horizontal position.

In the present embodiment of my invention, I employ three members or blades B and with adjacent blades spaced apart a predetermined distance to provide a passageway 7 open at opposite ends and extending entirely along said adjacent members or blades.

It is also to be particularly noted that the outer or upper side marginal portion of the member or blade B at the land side of the device projects or extends a material or pronounced distance beyond the land side end of the frog or plate 1 and the plate 2 carried thereby. This is of particular importance as it assures the cutting of the furrow outwardly or beyond the land side end of the frog so that said land side end and plate 2 carried thereby will be free of contact with the soil and thereby eliminate the draft resistance which would otherwise be offered.

It is also to be understood that during a working operation the working end portions or points P of the members or blades B are so arranged or positioned that the frog or plate 1 will be spaced from the bottom of the furrow cut by the points whereby liability of further draft resistance is eliminated.

As herein disclosed, the points P are detachable and each of said points is held in applied position with respect to a member or blade B by a coupling plate 8 contacting from below with the adjacent end portions of a member or blade B and point P and bolted, as at 9, or otherwise secured thereto.

In the present arrangement, the bolt connection 6 hereinbefore referred to also serves to hold the coupling plate 8 to the associated point P.

Each of the points P is substantially in the form of a V with the apex thereof forwardly disposed and is provided with a rearwardly directed shank portion 10 of the same width as the adjacent end of the associated member or blade B. The point proper at its junction with the shank 10 extends a predetermined distance outwardly or laterally beyond the shank 10 to provide the wings 11. In the assembly of the members or blades B and as particularly illustrated in Figure 1, it is to be noted that the opposed wings 11 of adjacent points P are positioned one in advance of the other whereby an irregular entrance space 12 is provided for the space 7. It is also to be particularly understood that the adjacent members or blades B are so spaced apart that such wings 11 extend beyond the transverse center of said space 7, particularly at the forward end of said space, or in other words the opposed wings 11 of adjacent points may be defined as being in overlying spaced relation.

These wings 11 operate effectively to cut or sever roots or the like which may be received between adjacent points P and the relation and assembly of the coacting wings 11 resulting, in substantially every instance, in a clean and quick cutting of such root or the like. In the event, however, the root should pass through an entrance space 12 without being cut or severed, it will have contact with the lower marginal edge of the upper member or blade B of the space 7 in which said root is received resulting in said root readily passing through the space 7 and cut through the open end thereof and thus effectively avoiding any liability of clogging and more particularly with a minimum of draft resistance.

As is particularly illustrated in Figure 3, I find it of advantage to bevel the side or longitudinal marginal portions of the members or blades B from below, as at 14, so that in such instances when a root passes by the wings 11 without severance, said marginal portions of the members or blades B will not bind or hold within the partly severed portion of said root but, on the contrary, will assure an unhindered or unobstructed passage of the root rearwardly and outwardly of the space 7.

As illustrated in Figure 1, attention is directed to the fact that the assembly is such that the points P provide what is known as a square cut and by having the points P each of a V formation, as herein disclosed, it will be readily understood that as the plow bottom advances in its work, the outwardly converging edges of the points will one counteract the other as pertains to a tendency of side draft and thereby assure the bottom advancing in the requisite forward path. The elimination of this objectionable side draft avoids the land side end of the frog or plate 1 and the parts concomitant or associated therewith coming into frictional contact with the land side of the furrow and thus facilitate the pulling of the device.

Interposed between the rear portions of the members or blades B and the rear portions of the arms 3 are the bracing or holding brackets or arms 15 and it is to be noted that these brackets or arms 15 are disposed laterally in a direction toward the turning side of the plow bottom and in such position and location to offer no obstruction to the spaces 7. It is to be further noted that each of said arms 15 is confined wholly and entirely behind its coacting member or blade B so that the liability of clogging is avoided and furthermore, eliminating any tendency of said bracket or arm 15 offering any draft resistance. The arrangement of the arms or brackets 15 also eliminates the liability of any roots or the like which may pass the points being obstructed in the desired travel through the spaces 7.

In the embodiment of my invention as illustrated in Figure 7, I disclose a plow point P' wherein the working or cutting edge is disposed entirely thereacross on a predetermined angle with respect to the longitudinal axis of the point, said cutting edge c extending from one wing 11' to the opposite side of the point. A point of this kind is adapted to be employed in connection with a side member or blade B' with the cutting edge c inwardly disposed so that said cutting edge c as carried by one side member or blade B' will offset or counterbalance the side draft of a similar point P' carried by the opposite side member or blade B'.

From the foregoing description it is thought to be obvious that a plow bottom constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A plow bottom comprising a frog, supporting arms carried by the frog and extending in advance thereof, cutting blades positioned above the frog, means for connecting the working end portions of the blades to the forward end portions of the supporting arms, and supporting means for the rear portions of the blades interposed between the blades and the arms, the supporting means for each blade being confined to the rear of the blade and free of the space between said blade and the blade adjacent thereto to prevent clogging between said adjacent blades.

2. A plow bottom, comprising a base plate, supporting arms carried by the plate and extending in advance thereof, elongated blade members attached to the forward end portions of said arms and supported thereby, removable plow points attached to the outer ends of said blades, said points being provided with suitable cutting angles wings on said plow points extending beyond the center between the adjacent blade members.

3. A plow bottom, comprising a base plate, spaced arms carried by the plate and extending in advance thereof, a plurality of spaced elongated blade members supported upon said arms, plow points removably attached to the forward end portions of said blade members, wings on said plow points disposed one in advance of the other to form an irregular entrance to the space between the blade members and said blade members being curved upwardly and outwardly as and for the purpose specified.

In testimony whereof I hereunto affix my signature.

GLEN FORGY.